(12) United States Patent
Grundmeyer et al.

(10) Patent No.: US 7,385,648 B2
(45) Date of Patent: Jun. 10, 2008

(54) IMAGE STATUS INFORMATION CORRECTION

(75) Inventors: Michael Grundmeyer, Mainz (DE); Lothar Werner, Rodgau (DE)

(73) Assignee: Matsushita Electric Industrial Co., Ltd., Osaka (JP)

( * ) Notice: Subject to any disclaimer, the term of this patent is extended or adjusted under 35 U.S.C. 154(b) by 596 days.

(21) Appl. No.: 11/117,577

(22) Filed: Apr. 29, 2005

(65) Prior Publication Data

US 2005/0243202 A1 Nov. 3, 2005

(30) Foreign Application Priority Data

Apr. 30, 2004 (EP) ................... 04010303

(51) Int. Cl.
*H04N 7/01* (2006.01)
*H04N 5/46* (2006.01)
(52) U.S. Cl. ............... 348/441; 348/558; 348/554
(58) Field of Classification Search ........... 348/441, 348/452, 443, 459, 699, 700, 554–558
See application file for complete search history.

(56) References Cited

U.S. PATENT DOCUMENTS

| 5,563,651 | A | * | 10/1996 | Christopher et al. .......... 348/97 |
| 5,734,420 | A | | 3/1998 | Lee et al. |
| 6,031,927 | A | | 2/2000 | Rao et al. |
| 7,039,111 | B2 | * | 5/2006 | Lee ....................... 375/240.16 |
| 7,075,581 | B1 | * | 7/2006 | Ozgen et al. ............... 348/448 |
| 7,233,361 | B2 | * | 6/2007 | Yang et al. ................. 348/441 |
| 2001/0002853 | A1 | | 6/2001 | Lim |
| 2004/0070686 | A1 | | 4/2004 | Jung et al. |

FOREIGN PATENT DOCUMENTS

EP 1 387 577 A2 2/2004

\* cited by examiner

*Primary Examiner*—M. Lee
(74) *Attorney, Agent, or Firm*—Wenderoth, Lind & Ponack, LLP

(57) ABSTRACT

The present invention relates to a correction of image status information assigned on a local basis to a video image. Upon evaluating a predefined image portion comprising a plurality of image elements, incorrect determinations are detected and eliminated.

30 Claims, 5 Drawing Sheets

IMAGE STATUS INFORMATION CORRECTION

Figure 1:
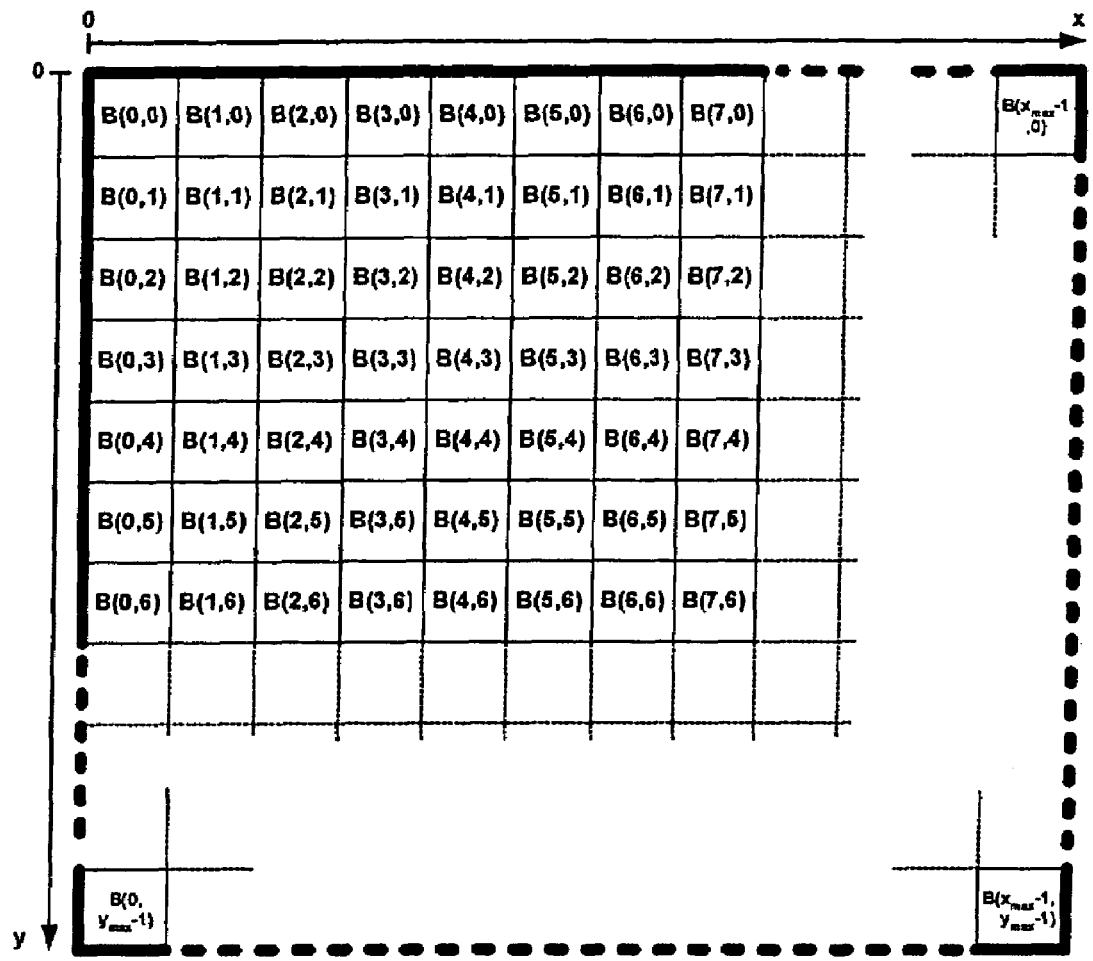

The present invention relates to an improved picture quality improvement processing. In particular, the present invention relates to a method for correcting status information accompanying video data and a corresponding image status information corrector.

Picture improvement processing is employed in an increasing number of applications, in particular, in digital signal processing of modern television receivers. Specifically, modern television receivers perform a frame-rate conversion, especially in form of a up-conversion or motion compensated up-conversion, for increasing the picture quality of the reproduced images. Motion compensated up-conversion is performed, for instance, for video sequences having a field or frame frequency of 50 Hz to higher frequencies like 60 Hz, 66.67 Hz, 75 Hz, 100 Hz, etc. While a 50 Hz input signal frequency mainly applies to television signal broadcasts based on the PAL or SECAM television standards, NTSC based video signals have an input frequency of 60 Hz. A 60 Hz input video signal may be up-converted to higher frequencies like 72 Hz, 80 Hz, 90 Hz, 120 Hz, etc.

During up-conversion, intermediate images are to be generated which reflect the video content at positions in time which are not represented by the 50 Hz or 60 Hz video sequence. For this purpose, the motion of moving objects has to be taken into account in order to appropriately reflect the changes between subsequent images caused by the motion of objects. The motion of objects is calculated on a block basis, and motion compensation is performed based on the relative position in time of the newly generated image between the previous and subsequent images.

For motion vector determination, each image is divided into a plurality of blocks. Each block is subjected to motion estimation in order to detect a shift of an object from the previous image.

High-end television sets and related devices perform frame rate conversion and image size scaling employing additional information related to the received image data. In addition to motion information, a film mode indication and further supplementary information is supporting the image processing. The film mode indication identifies whether or not the image data stem from a video camera (called "video mode" or "camera mode") or from a motion picture film (called "film mode"). In "video mode", a moving object is represented by different motion phases in each of the images in a video sequence. Thus, video mode can be detected by motion between each of the fields. In "film mode", the images stem from a motion picture to interlaced video data conversion. Such a conversion generates two or three fields from the same film frame such that a particular motion/no motion pattern can be detected.

When performing picture improvement processing, in particular based on motion compensation, the knowledge of the particular motion phase represented by each individual image is required to employ an appropriate processing scheme.

A detection of film mode indications, i.e. whether or not a current image is in video or film mode, is already known, for instance, from EP-A-1 198 137.

The present invention aims to improve the quality of status information associated to image data in order to increase the reliability of the status information and to enable a more appropriate picture quality improvement processing. Thus, it is the object of the present invention to provide a method for correcting status information of video images and a corresponding image status information corrector.

This is achieved by the features of the independent claims.

According to a first aspect of the present invention, a method for correcting status information of video images is provided. The status information is assigned to each image element in a video image which comprises a plurality of image elements. The status information includes at least two different modes. The method counts the number of image elements having status information of a predetermined mode within a predefined image area. The count value is compared to a predetermined threshold. If the count value exceeds the threshold, all image elements of the predefined image area are set to the predetermined mode.

According to further aspects of the present invention, an image status information corrector is provided for correcting status information of video images. The status information is assigned to each image element in the video image comprising a plurality of image elements. The status information includes at least two different modes. The image status information corrector comprises a counter, a comparator, and a mode setter. The counter counts the number of image elements having status information of a predetermined mode within a predefined image area. The comparator compares the count value to a predetermined threshold. The mode setter sets all image elements of the predefined image area to the predetermined mode If the count value exceeds this threshold.

It is the particular approach of the present invention to improve the reliability of status information associated to video images wherein the status information is assigned to the video data in form of a local characteristic assigned to individual image elements. The status information of a predefined image area is evaluated and compared to the surrounding status information. If the evaluation reveals that the status assigned to a particular image element appears unreliable, this status information is corrected. For this purpose, the number of image elements having a particular status mode is counted. The count result is compared to a preset threshold. If the count value exceeds the threshold, it is assumed that image elements of another mode are unreliable irregularities and corrected accordingly. In this manner the reliability of status information can be increased and a subsequent image processing improved.

The determination of characteristics of an image on a local basis, preferably on a block basis, may return particular image elements (blocks) not enabling a correct status determination. A concealment of such determination failures is achieved by the present invention, namely by referring to status information of other image elements/blocks within a predefined image area.

Preferably, the predefined image area comprises a predetermined number of block lines or block columns of a video image, most preferably a single block line or column of blocks. In this manner, all blocks of a line or column are analyzed and set to a particular mode if a threshold of a predetermined number blocks having that mode is detected.

Preferably, the predefined image area comprises a plurality of blocks within an area of a predetermined horizontal and vertical size. Accordingly, the image area evaluated for status information and correction can be set arbitrarily. For instance, the size of the image area may be set in accordance with the borders of image objects. In this manner, an image content related correction can be performed.

Preferably, the status information is a binary value. The modes of the status information preferably include a film mode/video mode. According to a further preferred embodiment, the status information includes a film mode and/or a motion pattern. The motion pattern preferably indicates a motion picture-to-interlaced conversion pattern. Accordingly, the image processing of interlaced fields can be appropriately performed based on status information of improved reliability.

Preferably, the count value is compared to a second predefined threshold and, if it turns out that the count value is smaller than the second threshold, all blocks are set to another mode of the status information. Accordingly, a mode correction can be achieved in a simple manner for more than one mode of said status information.

Preferred embodiments of the present invention are the subject matter of dependent claims.

Figure 2:
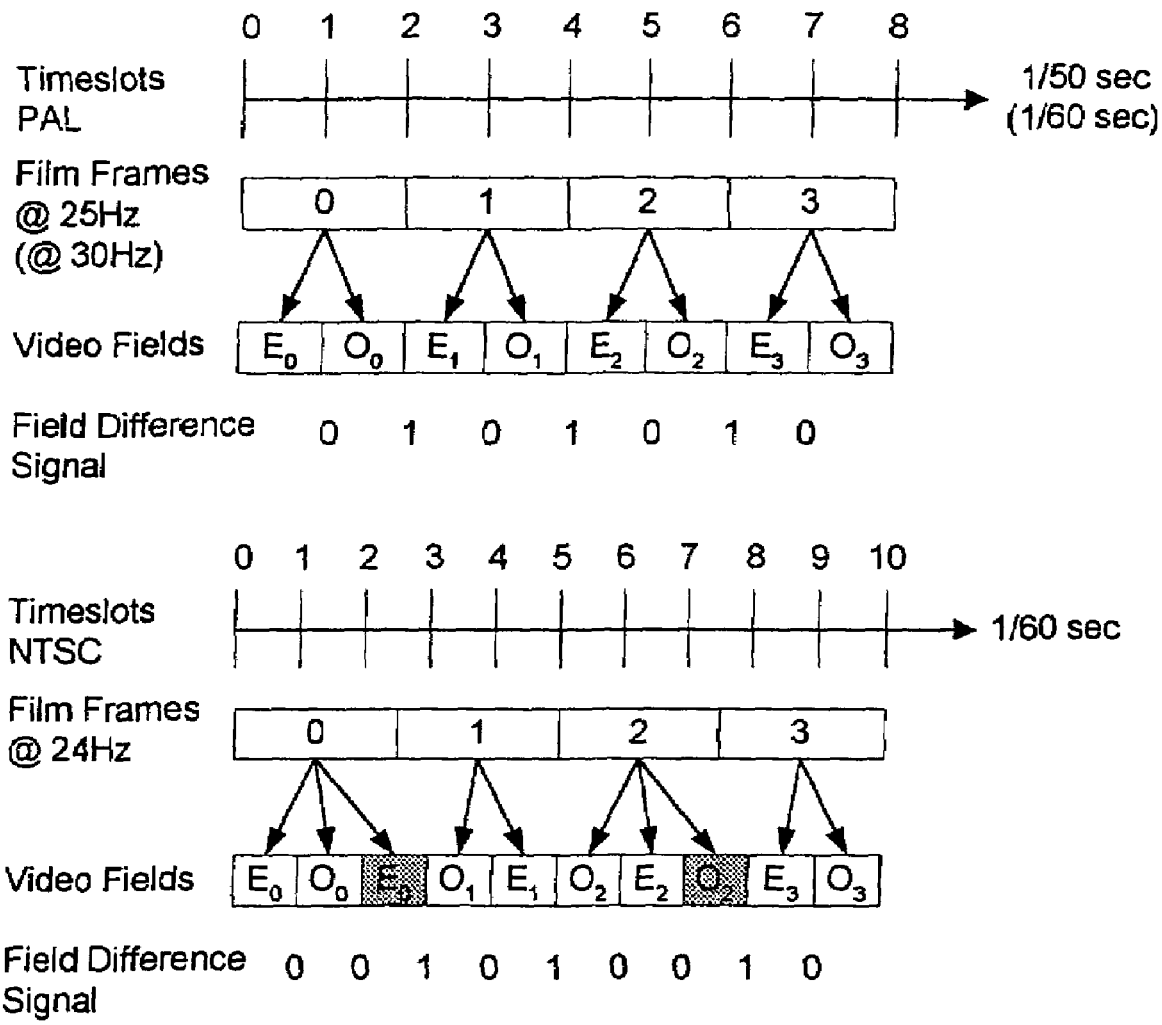
Figures 3, 4:
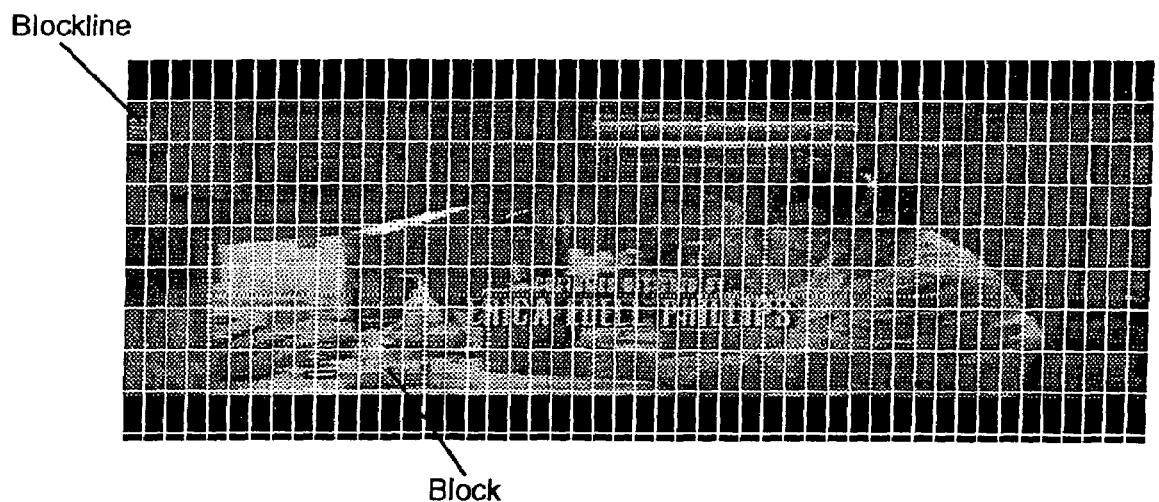
Figure 5:
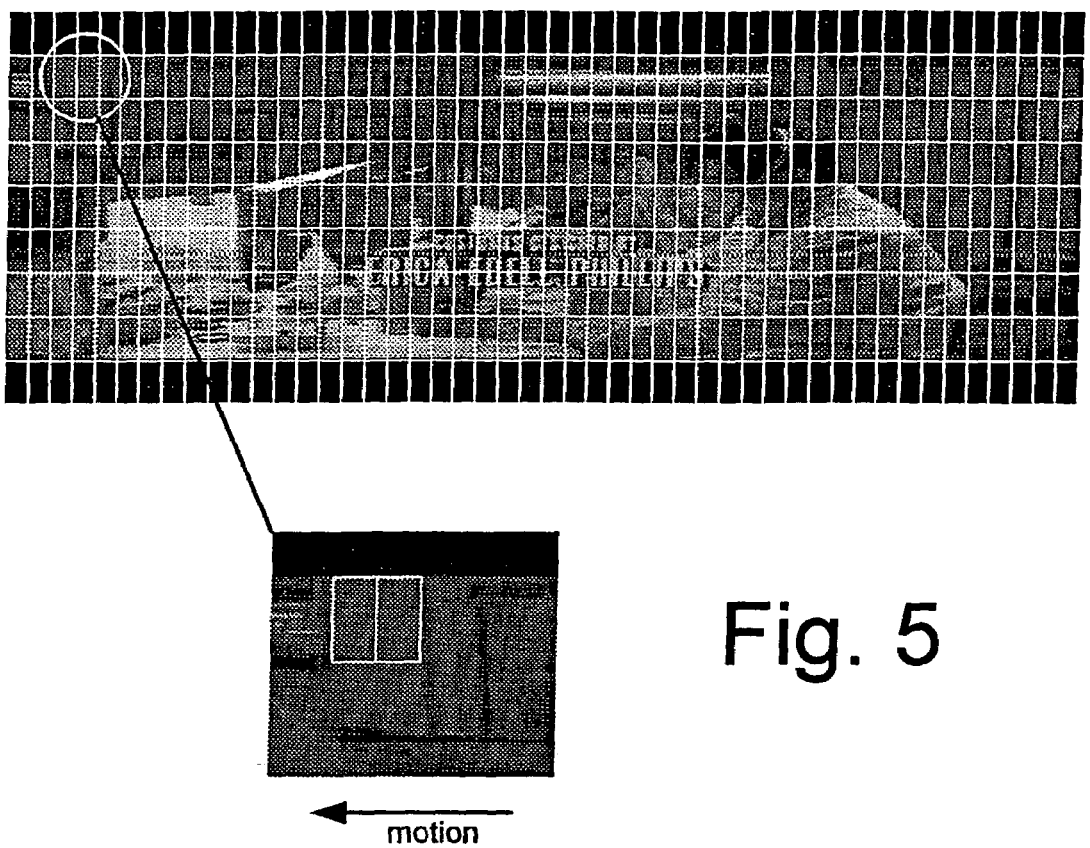
Figure 6:
Figure 7:
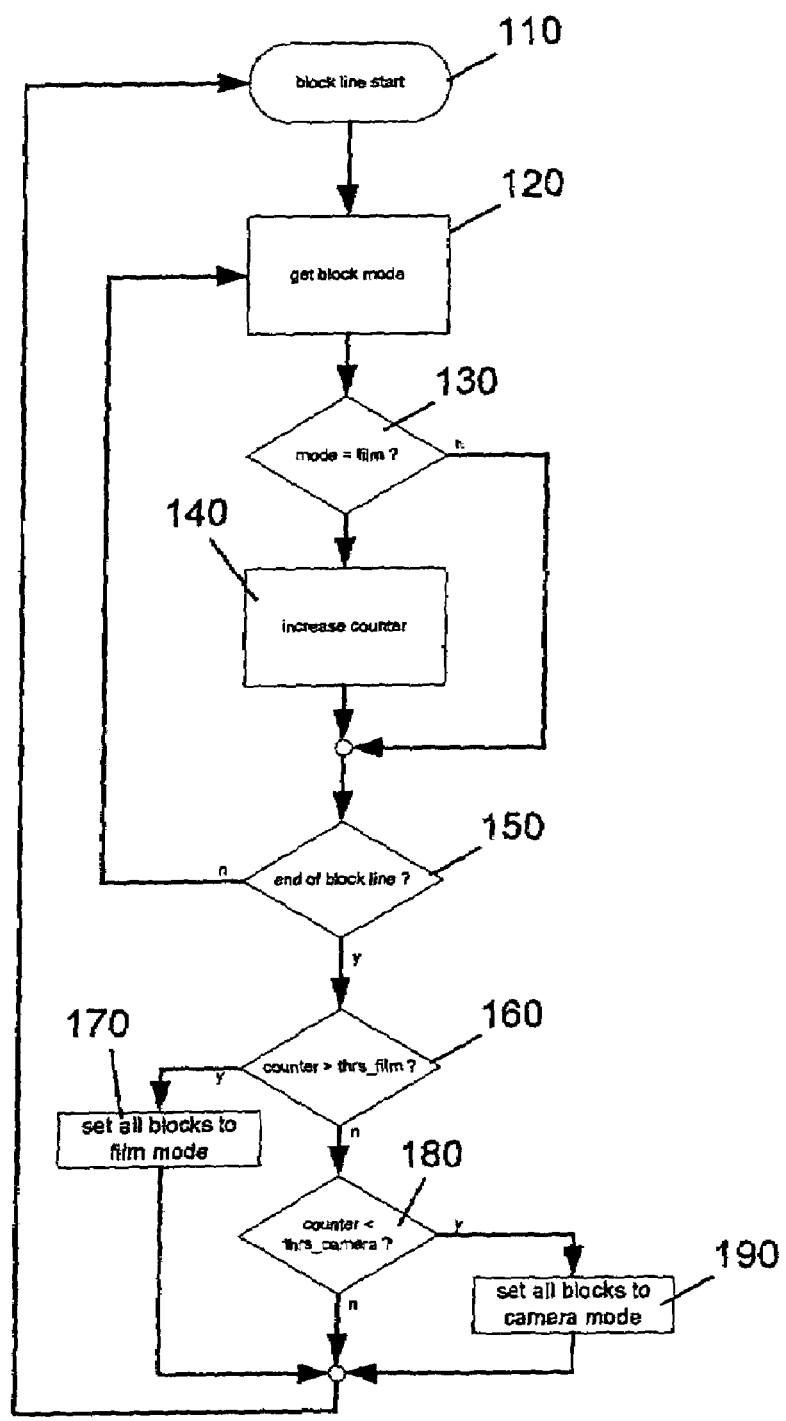

Other embodiments and advantages of the present invention will become more apparent from the following description of preferred embodiments, in which:

FIG. 1 illustrates a division of a video image into a plurality of blocks of a uniform size, FIG. 2 illustrates a motion picture film to interlaced video conversion, FIG. 3 illustrates the determination of film motion pattern for interlaced video sequences, FIG. 4 illustrates an example of a division of a video image into a plurality of blocks, FIG. 5 illustrates particular image areas which might cause the detection of status information to fail, FIG. 6 illustrates an example determination of status information on a block basis, and FIG. 7 is flow chart illustrating an example of steps to be executed in accordance with the present invention for status information correction.

The present invention relates to digital signal processing, especially to digital signal processing in modern television receivers. Modern television receivers employ up-conversion algorithms in order to increase the reproduced picture quality. For this purpose, intermediate images are to be generated from two subsequent images. For generating an intermediate image, the motion of moving objects has to be taken into account in order to appropriately adapt the object position to the point of time reflected by the interpolated image.

Motion estimation for determining a motion vector and motion compensation are performed on a block basis. For this purpose, each image is divided into a plurality of blocks as illustrated, for example, in FIG. 1. Each block is individually subjected to motion estimation by determining a best matching block in the previous image.

In order to be able to correctly apply motion compensation to an image area, the determination of a film mode indication, i.e. film mode or video mode, for that image area is required. By applying a correct picture quality improvement processing in accordance with the detected film mode indication, image artifacts are avoided and an improved picture quality can be achieved.

Such a video signal processing is particularly required to drive progressive displays and to make use of higher frame rates, in particular for HDTV display devices. The detection of motion picture film converted into interlaced image sequences for television broadcast (further referred to as film mode) is crucial for the signal processing.

For picture improvement processing an interlaced/progressive conversion (I/P) is possible in form of an inverse telecine processing, i.e. a re-interleaving of even and odd fields. For image sequences stemming from a 3-2 pull down scheme, the single redundant field in the triplet of fields stemming from the same film frame (the grey colored fields in FIG. 2) is eliminated.

More advanced up-conversion algorithms employ a motion vector based interpolation of frames. The output frame rate can be an uneven fraction of the input video rate for instance a 60 Hz input signal frequency may be up-converted to a 72 Hz output frequency corresponding to a ratio of 5:6. Accordingly, only every sixth output frame can be generated from a single input field alone when a continuous motion impression of moving objects is to be maintained.

The film-mode characteristic of an image may be determined on a image basis or, according to an improved approach, be a local characteristic of individual image areas. In particular, television signals are composed of different types of image areas such as no-motion areas (e.g. logo, background), video camera areas (e.g. newsticker, video insertion) and film mode areas (e.g. main movie, PIP). A pull down scheme detection is separately performed for each of these image areas enabling an up-conversion result with improved picture quality.

Film mode detection generally involves a recognition of a pull down pattern. Conventionally, pixel differences are accumulated to a Displaced Frame Difference (DFD) representing the motion between subsequent images. In order to avoid sudden changes in the detected film-mode indication, which would result in an unstable impression to the viewer, detection delays are employed for triggering a switch from a film mode to a video mode and vice versa.

In order to increase the film mode indication accuracy, a film mode detection is performed on a block basis, as illustrated for instance in FIG. 1. For each block of a pixel size of m*n, a motion vector and film mode indication are determined. In addition to a horizontal and vertical motion vector component, a film mode indication is stored indicating whether the current block is film mode or video mode. Further, a correction of the assigned film mode indication is indicated by the "artificial mode" indication in order to distinguish an original film mode indication from a later correction thereof.

The film mode determination is preferably based on luminance value differences between subsequent fields. The number of fields to be evaluated depends on the kind of motion pattern to be determined, i.e. whether a 2-2 pull down, a 3-2 pull down or a combination of both needs to be detected.

During film mode evaluation, the determination may fail for some of the blocks resulting in a missing or wrong determination result. These determination failures lead to a reduced performance of a subsequent image processing, in particular of interpolation algorithms.

The film mode determination is preferably based on the respective differences of luminance values between two corresponding image blocks in subsequent fields. The basic principle of film mode determination is illustrated in FIG. 3. As can be seen therefrom, two fields stem from a single motion picture film frame. The difference calculated between subsequent fields is dependent on whether the fields stem from the same or from a different motion picture film frame. Accordingly, a binary film mode pattern can be generated indicating a large difference by a logic "1" and a small difference by a logic "0". The binary values indicate whether or not motion is present between subsequent fields. The detected motion pattern is stored in a register and compared to predetermined reference patterns in order to detect the employed pull down scheme.

The film mode determination is performed on a block basis as illustrated, for instance, in FIG. 1 and FIG. 4.

The film mode determination mainly suffers from the following main problems. First, noise present in a video image distort the respective luminance values and may cause errors in the resulting mode determination.

Further, a very slow motion of an image object does not enable an accumulation result of differences exceeding the predefined threshold. Accordingly, the very slow motion may result in an incorrect film mode determination, incorrectly indicating video/camera mode although the respective images stem from a telecine conversion.

In addition, unstructured areas within an image do not enable the detection of differences although motion may be present. An example for such a image portion which does not enable the detection of motion is illustrated in FIG. 5.

An example of film mode indications determined on a block basis is illustrated in FIG. 6. The illustrated example indicates four blocks labelled "C" which have been determined to be in camera mode C instead of film mode F. As can be seen from FIG. 5, film mode determination has failed for these image areas as these blocks relate to unstructured image portions and, consequently, do not enable a reliable film mode determination. These incorrectly determined film mode indications cause an inappropriate picture processing for these blocks resulting in a reduced picture quality perceived by the viewer.

In order to detect and eliminate such irregularities within the determined local image characteristics, the present invention suggests analysing the film mode indications within a predefined image area and correcting the modes depending on the evaluated distribution of a particular mode.

According to a preferred embodiment of the present invention, all film mode indications are evaluated for an individual line of pixels. The number of blocks in film mode is counted, and if the number of counted film mode blocks exceeds a predefined threshold, the mode for all blocks of that row is set to film mode.

At the same time, a video mode correction can be performed. For this purpose, the count value is further compared to a second threshold set in advance for video mode. If the count value is smaller than the second threshold, all blocks of the respective line are set to video mode.

If the count value does neither exceed the first threshold nor falls below the second threshold, the determined film mode indications are maintained.

This processing is repeated for each line of blocks of a video image such that the reliability of determined characteristics for all blocks of the image is increased.

According to a preferred example, the first threshold for correcting all detected modes of a block line to film mode is set to a value of around 95% of the total number of blocks per line. The second threshold for correcting the detected modes of a complete block line to video mode is preferably set to a value of around 5% of the total number of blocks per line. Preferably, the values are set adaptively to the respective image content and transmission quality.

According to preferred example implementations of the above embodiment, the first threshold is set between a value of 85-98% of the total number of blocks per line, most preferably to a value between 90-96%. Further, the lower threshold for camera mode corrections is set to a value between 2-15% of the total number of blocks per line, most preferably to a value between 4-10%. The values used for the thresholds depend on the quality of the block mode determination, block size and number of blocks.

A flow chart for performing the present invention is illustrated in FIG. 7. The described method of FIG. 7 is performed for each block line individually. After the evaluation of a block line has been started in step 110, the mode of the first block is obtained in step 120. If the obtained mode is film, step 130 branches to step 140 in order to increase the count value. Otherwise, step 130 branches to step 150 in order to determine whether or not the last block of a block line has been reached.

As long as the last block of a line has not been reached, the count value is increased upon each detection of a film mode block.

After having analysed all blocks of a line, the count value is compared to a first threshold value thrs_film in step 160. If the count value exceeds the threshold, all blocks of that line are set to film mode in step 170.

Preferably, the count value is further compared to a second threshold value thrs_camera in step 180. If the count value is smaller than the second threshold value, thrs_camera, all blocks of that row of blocks are set to video mode in step 190.

The skilled person is aware that the correction is not limited to an evaluation of blocks per line. In a manner corresponding to the above described embodiment for a correction on a block row basis, the image blocks may be evaluated and corrected for each column of blocks in a video image, or alternatively, based on a plurality of combined rows or columns.

Further, the size and form of the image elements for which a mode information has been determined is not limited to blocks. The skilled person is aware that any kind of image elements can be used for this purpose.

Summarising, the present invention relates to a correction of image status information assigned on a local basis to a video image. Upon evaluating a predefined image portion comprising a plurality of image elements, incorrect determinations are detected and eliminated.

The invention claimed is:

1. A method for correcting status information of video images, said status information being assigned to a plurality of image elements in a video image comprising a plurality of image elements and said status information including at least two different modes, the method comprising the steps of:

counting the number of image elements having status information of a predetermined mode within a predefined image area, comparing the count value to a predetermined threshold, and setting all image elements of said predefined image area to said predetermined mode if the count value exceeds said threshold.

2. A method according to claim 1, wherein said video images comprising a plurality of image elements in form of blocks in a block raster arrangement.

3. A method according to claim 2, wherein said predefined image area comprising a predetermined number of block lines of said video image.

4. A method according to claim 3, wherein said predetermined number being a single block line.

5. A method according to claim 2, wherein said predefined image area comprising a predetermined number of block columns of said video image.

6. A method according to claim 5, wherein said predetermined number being a single column of blocks.

7. A method according to claim 2, wherein said predefined image area comprising all blocks within an area of a predetermined horizontal and vertical size.

8. A method according to claim 1, wherein said status information being a binary value.

9. A method according to claim 1, wherein the modes of said status information include a film mode and a video mode.

10. A method according to claim 1, wherein the modes of said status information include a still mode.

11. A method according to claim 1, wherein the modes of said status information include a motion pattern.

12. A method according to claim 11, wherein said motion pattern indicate a motion picture-to-interlaced conversion pattern.

13. A method according to claim 1, further comprising the steps of:
   comparing the count value to a second predefined threshold, and
   setting all image elements of said predefined image area to another mode if the count value is smaller than said second threshold.

14. A method according to claim 2, which is applied to all blocks of an image in a consecutive manner.

15. A method for performing a motion compensated image processing comprising the steps of:
   receiving image data together with status information of a current image,
   correcting the status information of the current image by applying a method in accordance with claim 1, and
   performing a motion compensated image processing based on the corrected status information.

16. An image status information corrector for correcting status information of video images, said status information being assigned to each image element in a video image comprising a plurality of image elements and said status information including at least two different modes, comprising:
   a counter for counting the number of image elements having status information of a predetermined mode within a predefined image area,
   a comparator for comparing the count value to a predetermined threshold, and
   a mode setter for setting all image elements of said predefined image area to said predetermined mode if the count value exceeds said threshold.

17. A image status information corrector according to claim 16, wherein said video images comprising a plurality of image elements in form of blocks in a block raster arrangement.

18. An image status information corrector according to claim 17, wherein said predefined image area comprising a predetermined number of block lines of said video image.

19. An image status information corrector according to claim 18, wherein said predetermined number being a single block line.

20. An image status information corrector according to claim 17, wherein said predefined image area comprising a predetermined number of block columns of said video image.

21. An image status information corrector according to claim 20, wherein said predetermined number being a single column of blocks.

22. An image status information corrector according to claim 17, wherein said predefined image area comprising all blocks within an area of a predetermined horizontal and vertical size.

23. An image status information corrector according to claim 16, wherein said status information being a binary value.

24. An image status information corrector according to claim 16, wherein the modes of said status information include a film mode and a video mode.

25. An image status information corrector according to claim 16, wherein the modes of said status information include a still mode.

26. An image status information corrector according to claim 16, wherein the modes of said status information include a motion pattern.

27. An image status information corrector according to claim 26, wherein said motion pattern indicate a motion picture-to-interlaced conversion pattern.

28. An image status information corrector according to claim 16, further comprising:
   a second comparator for comparing the count value to a second predefined threshold, and
   a second setter for setting all image elements of said predefined image area to another mode if the count value is smaller than said second threshold.

29. An image status information corrector according to claim 17, for correcting all blocks of an image in a consecutive manner.

30. An image status information corrector for performing a motion compensated image processing, comprising:
   an image status information corrector in accordance with claim 16, and
   a selector for selecting motion compensation in accordance with the corrected status information.

* * * * *